US006860257B2

(12) United States Patent
Wood

(10) Patent No.: US 6,860,257 B2
(45) Date of Patent: Mar. 1, 2005

(54) PROCESSING APPARATUS AND METHOD

(76) Inventor: James L. Wood, 17878 Raven Rd., Granby, MO (US) 64844

( * ) Notice: Subject to any disclaimer, the term of this patent is extended or adjusted under 35 U.S.C. 154(b) by 260 days.

(21) Appl. No.: 10/336,432

(22) Filed: Jan. 3, 2003

(65) Prior Publication Data

US 2004/0129235 A1 Jul. 8, 2004

(51) Int. Cl.[7] ........................................ B29C 47/40
(52) U.S. Cl. .................... 123/698; 419/67; 264/211.21
(58) Field of Search ............................... 123/1 A, 2, 3, 123/698, 556–557, 541–542; 419/67; 264/211.21, 177.11

(56) References Cited

U.S. PATENT DOCUMENTS

| | | | | | |
|---|---|---|---|---|---|
| 2,702,408 | A | * | 2/1955 | Hartland | 264/211.21 |
| 5,174,725 | A | * | 12/1992 | Guile et al. | 417/205 |
| 5,213,737 | A | * | 5/1993 | Ford et al. | 264/109 |
| 5,320,794 | A | * | 6/1994 | Holmes | 264/211.21 |
| 5,375,778 | A | * | 12/1994 | Lundquist | 241/20 |
| 5,494,425 | A | * | 2/1996 | Stehr | 418/83 |
| 6,213,745 | B1 | * | 4/2001 | Woodcock et al. | 418/206.7 |
| 6,506,311 | B2 | * | 1/2003 | DeGarmo et al. | 210/788 |
| 6,800,233 | B2 | * | 10/2004 | Golomb et al. | 264/177.11 |
| 2003/0065296 | A1 | * | 4/2003 | Kaiser et al. | 604/368 |
| 2004/0041296 | A1 | * | 3/2004 | Bruck et al. | 264/148 |
| 2004/0115324 | A1 | * | 6/2004 | Richard et al. | 426/512 |

OTHER PUBLICATIONS

Pending U.S. patent application, "Method for Processing and Recycling Animal Waste and Method for Doing Business Using the Same", U.S. Appl. No. 10/199,624 filed on Jul. 19, 2002.

* cited by examiner

*Primary Examiner*—Hai Huynh
(74) *Attorney, Agent, or Firm*—Martin & Associates, LLC; Derek P. Martin

(57) ABSTRACT

A processing apparatus is powered by an internal combustion engine. Airborne emissions that are separate from the exhaust of the internal combustion engine are produced during processing. An air feedback mechanism directs the airborne emissions produced during processing to the air intake of the internal combustion engine, resulting in the emissions being combusted within a combustion area in the internal combustion engine. By combusting the emissions, the harmful level of emissions is reduced.

27 Claims, 6 Drawing Sheets

PROCESSING APPARATUS AND METHOD

RELATED APPLICATION

This patent application is related to my copending patent application, "METHOD FOR PROCESSING AND RECYCLING ANIMAL WASTE AND METHOD FOR DOING BUSINESS USING THE SAME", Ser. No. 10/199,624 filed on Jul. 19, 2002, which is incorporated herein by reference.

BACKGROUND OF THE INVENTION

1. Technical Field

This invention generally relates to the field of processing machines, and more specifically relates to a processing apparatus and method that reduces airborne emissions of a processing apparatus that is driven by an internal combustion engine.

2. Background Art

Many processing machines give off airborne emissions as a result of performing their processing function. These emissions can include harmful pollutants that degrade the quality of the air. For example, screw-type extruders have been used to process soybeans and other agricultural products. In addition, applicant's related invention disclosed in Ser. No. 10/199,624 discloses a screw-type extruder that is used to process animal waste, such as soiled poultry litter. Because a screw-type extruder generates significant heat, the processed material that is output from the extruder often puts off steam and other airborne emissions that result from the processing. These emissions can result in pollution levels that are unacceptable. What is needed is a way to reduce airborne emissions that result from processing using such a machine.

DISCLOSURE OF INVENTION

According to the preferred embodiments, a processing apparatus is powered by an internal combustion engine. Airborne emissions that are separate from the exhaust of the internal combustion engine are produced during processing. An air feedback mechanism directs the airborne emissions produced during processing to the air intake of the internal combustion engine, resulting in the emissions being combusted within a combustion area in the internal combustion engine. By combusting the emissions, the harmful level of emissions is reduced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Machines have been used for many years in many commercial, industrial and farm processes. Some of these machines are driven by an internal combustion engine. The present invention pertains to machines driven by an internal combustion engine that process a material, where the processing results in airborne emissions that are separate from the emissions of the internal combustion engine. The airborne emissions that result from the processing are directed to a combustion area in the internal combustion engine, where they are combusted. By combusting the airborne emissions, the levels of airborne emissions are reduced.

Figure 1:
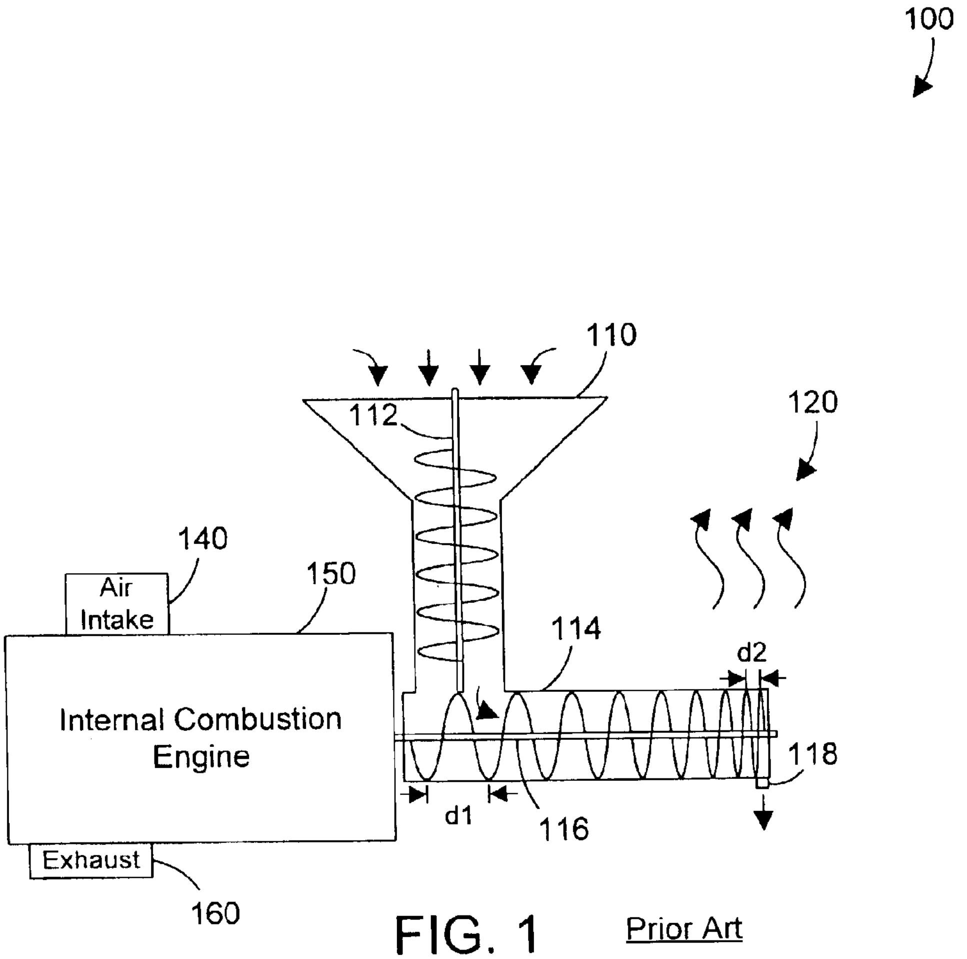
FIG. 1 Prior Art
FIG. 1 is a block diagram of a prior art apparatus.

One specific example of an existing apparatus that could be modified according to the teachings of the preferred embodiments is a screw-type extruder 100 shown in FIG. 1. Screw-type extruders are known in animal husbandry for producing food and feed products. Examples of screw-type extruders are dry extruders manufactured and marketed by Insta-Pro International, 10104 Douglas Avenue, Des Moines, Iowa 50322. Two different known Insta-Pro extruders include the model 2500 extruder and the model 9800 extruder. Of course, other screw-type extruders from Insta-Pro or from other manufacturers could be used within the scope of the preferred embodiments.

The term "screw-type extruder" is used herein to include any apparatus with an auger (screw) that has blades that decrease in distance apart along the direction of travel for the product being processed. In the art of processing food and feed, these extruders are known as dry extruders that are capable of cooking, sterilizing, and dehydrating a wide range of food and feed products. A screw-type extruder typically has no source of heat. The product being processed is heated by friction. As the product passes down the length of the auger, it is compressed by the auger blades that are increasingly close together. This creates both pressure and heat. The resulting product is cooked, sterilized, and dried by running the product through the extruder. Screw-type extruders have been used in the food and feed field to generate high-quality food products and animal feed.

In the prior art, screw-type extruders have been used exclusively for processing food and animal feed. Research has been performed that shows that a screw-type extruder may be used to process dead birds and feathers into components for animal feed. The applicant's copending application Ser. No. 10/199,624 filed on Jul. 19, 2002, discloses the use of a screw-type extruder for processing animal waste, such as soiled poultry litter.

The function of a prior art screw-type extruder 100 is represented graphically in FIG. 1. Product is initially introduced into a hopper 110. A first auger 112 rotates, which moves product being processed from the hopper 110 to a second auger 116. Auger 116 rotates, thereby pushing the product being processed into a constricted area 114, where the product is trapped between the blades of the auger. Note that auger 116 has blades that are increasingly closer together along the path of travel of the product. For example, as shown in FIG. 1, the auger blades at the front of auger 116 are a distance d1 apart, while the blades at the end of auger

116 are a distance d2 apart that is much smaller than d1. As the product passes down the constricted area 114, it is compressed by the decreasing distance between auger blades, and is heated by friction with the walls of constricted area 114 and by friction with the auger blades. The result is that the product may be "cooked" in a very short time, because the heat and pressure combine to remove moisture and reduce the volume of the product being processed as the product travels through extruder 100. At the end of constricted area 114 is a discharge port 118 where the finished product comes out of the extruder 100.

Internal combustion engine 150 preferably turns the auger 116, and may also turn auger 112. Internal combustion engine 150 includes an air intake 140 that draws air into a combustion area of the engine 150. After combustion in the combustion area of the engine 150, the resulting exhaust is expelled out of exhaust 160.

The sales literature of Insta-Pro International states that an Insta-Pro dry extruder typically takes less than 30 seconds to cook and dehydrate the product, and the resulting heat of 140° C. to 160° C. sterilizes the product. In addition, a screw-type extruder is a continuous-feed machine, allowing unprocessed material to be placed in the hopper as the machine discharges processed product out the discharge port. Due to the friction and compression that occurs in the extruder, the finished product leaving the extruder is hot.

In the prior art extruder 100 shown in FIG. 1, as finished product is discharged from the discharge port 118, airborne emissions 120 are released into the air. These emissions may contain harmful materials or pollutants. For example, in processing soybeans, airborne oil particles are typically emitted into the air. In processing soiled litter as disclosed in the related copending application, ammonia and methane may be emitted into the air. Performing a significant amount of processing using extruder 100 may result in releasing a significant quantity of emissions 120 into the air.

The preferred embodiments reduce the airborne emissions resulting from processing a material by directing the airborne emissions into the air intake of the internal combustion engine that drives the extruder. This results in the airborne emissions being directed to a combustion area within the internal combustion engine, where the airborne emissions are combusted as the engine runs. One example of such an apparatus in accordance with the preferred embodiments is shown as apparatus 200 in FIG. 2. Note that many of the items shown in FIG. 2 have the same reference designator numbers shown in FIG. 1. However, additional items are shown which distinguish this apparatus 200 from the prior art apparatus 100.

Apparatus 200 in accordance with the preferred embodiments includes a collection mechanism 210 that is placed around the portion of the extruder that includes the discharge port 118. The collection mechanism 210 is preferably open at the bottom, allowing the finished material to drop downward into a hopper, truck, or other appropriate area. The collection mechanism 210 is coupled to a conduit 220 that is coupled to the air intake 150 of the internal combustion engine 160. With this configuration, airborne emissions 120 that result from processing the material using the extruder are directed from the collection mechanism 210 into conduit 220 and into the air intake 150 of the internal combustion engine, as shown by the arrows within conduit 220. Note that airflow is generated by the internal combustion engine 160 running, which draws air from its air intake 150 into the engine. The result is a pressure differential that creates airflow, drawing air from the collection mechanism 210 into conduit 220 and into the air intake 150. The airborne emissions 120 are directed to air intake 150, which results in the airborne emissions being combusted in a combustion area of the internal combustion engine 160.

Figure 2:
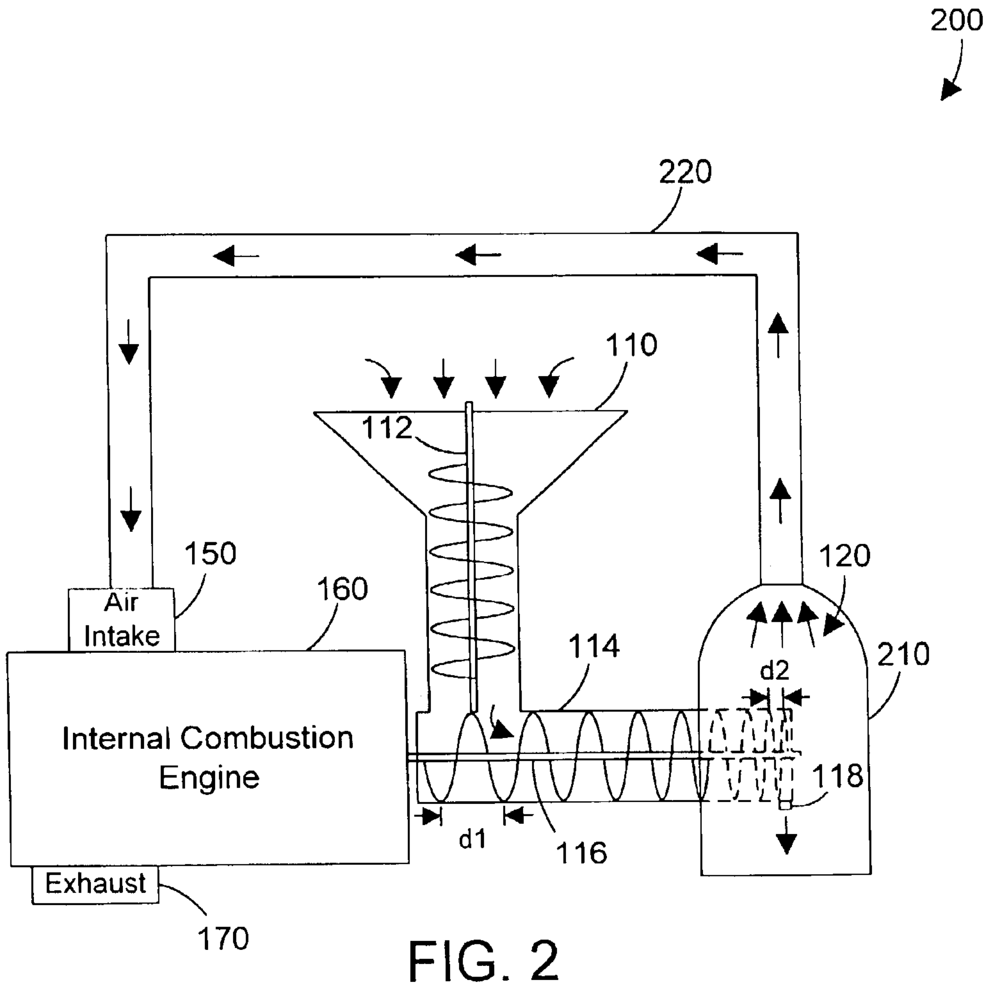
FIG. 2 is a block diagram of a first apparatus in accordance with the preferred embodiments.

The collection mechanism 210 is shown in FIG. 2 to be in a bell-type configuration, but the collection mechanism 210 can be in any suitable configuration that results in directing airborne emissions 120 into the air intake 150 of the internal combustion engine 160. In addition, collection mechanism 210 could be omitted altogether, although fewer airborne emissions would then be directed into conduit 220. Conduit 220 may consist of any suitable passageway that allows airflow between collection mechanism 210 and air intake 150. The preferred embodiments expressly extend to any and all air feedback mechanisms that direct one or more airborne emissions to a combustion area of an internal combustion engine.

Internal combustion engine 160 broadly includes any engine that produces a motive force by combusting a fuel/air mixture. Suitable internal combustion engines include gasoline engines, diesel engines, and engines that burn natural gas, propane, alcohol, hydrogen, and any other suitable combustible fuel.

Figure 3:
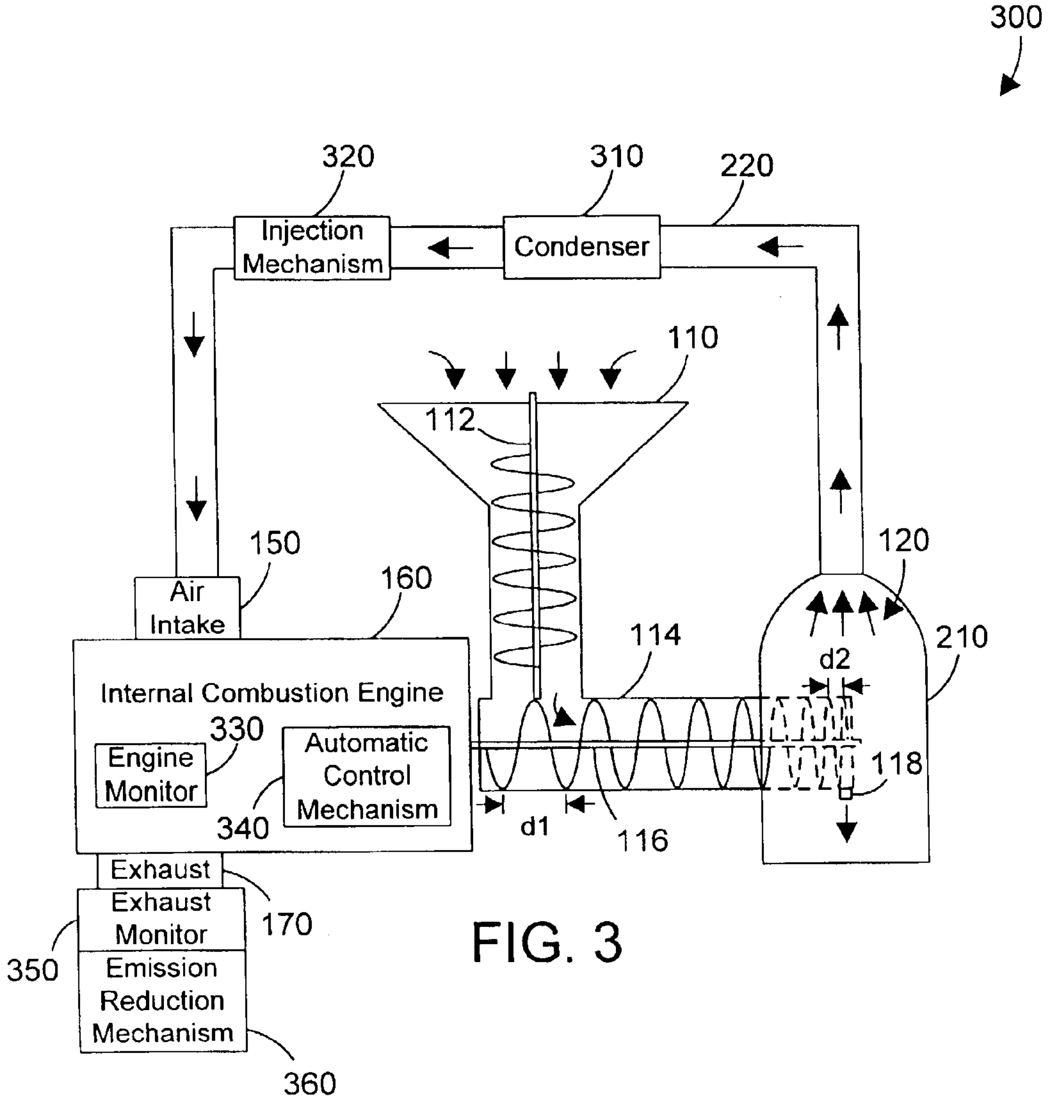
FIG. 3 is a block diagram of a second apparatus in accordance with the preferred embodiments.

Referring to FIG. 3, another apparatus 300 in accordance with the preferred embodiments includes several additional optional features that may enhance the performance and reduce emissions of apparatus 300. For example, a condenser 310 may be placed inline with the airflow in conduit 220 to condense out some of the airborne emissions from the airflow. An injection mechanism 320 may inject any suitable additive into the airflow to improve the performance of the engine 160 or to reduce the emissions of the engine 160. Any suitable additive may be injected into the airflow by injection mechanism 320, including any suitable gas, or any suitable liquid that may be sprayed in a fine mist. Chemical additives may combine with airborne emissions to create less harmful emissions, to act as a catalyst, or to enhance the effect of combusting the emissions. In the alternative, a fuel may be injected to enhance the performance of combusting the emissions by engine 160. In short, any and all liquid or gas additives that may affect the performance of engine 160 or the emissions in the exhaust of the engine 160 are within the scope of the preferred embodiments.

An engine monitor 330 preferably monitors the performance of the engine 160, such as the running speed. An automatic control mechanism 340 allows automatically performing some corrective action while the apparatus 300 is processing a material. Note that engine monitor 330 and automatic control mechanism 340 are shown as part of engine 160, but could also be separate and distinct from engine 160.

Automatic control mechanism 340 could vary the throttle or choke of the engine 160, or could cause injection mechanism 320 to inject a suitable additive into the airflow. In addition, an exhaust monitor 350 may be coupled to the exhaust 170 of engine 160, and an emission reduction mechanism 360 may further be used. Exhaust monitor 350 provides real-time analysis of one or more emissions in the exhaust. Note that automatic control mechanism 340 may also perform automatic control functions according to the emissions in the engine exhaust monitored by the exhaust monitor 350. Thus, the automatic control mechanism 340 could vary the throttle or choke of the engine 160, or could cause injection mechanism 320 to inject an additive into the airflow. Emission reduction mechanism 360 is any suitable mechanism for reducing airborne emissions in the exhaust, which may include running the exhaust through a suitable liquid to further reduce airborne emissions.

Figure 4:
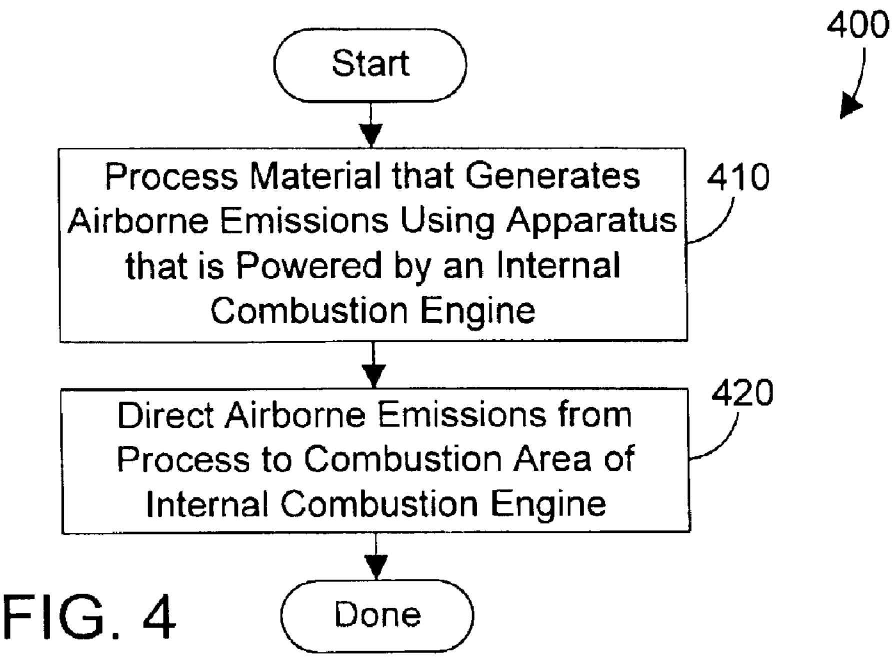
FIG. 4 is a flow diagram of a method in accordance with the preferred embodiments.

Various methods are shown in FIGS. 4–8 within the scope of the preferred embodiments. Referring to FIG. 4, method 400 begins by processing a material that generates airborne emissions using an apparatus that is powered by an internal combustion engine (step 410). Note that the airborne emissions generated by the processing are preferably separate and distinct from the emissions in the exhaust of the engine. Next, the airborne emissions from the process are directed to a combustion area of the internal combustion engine (step 420).

Figure 5:
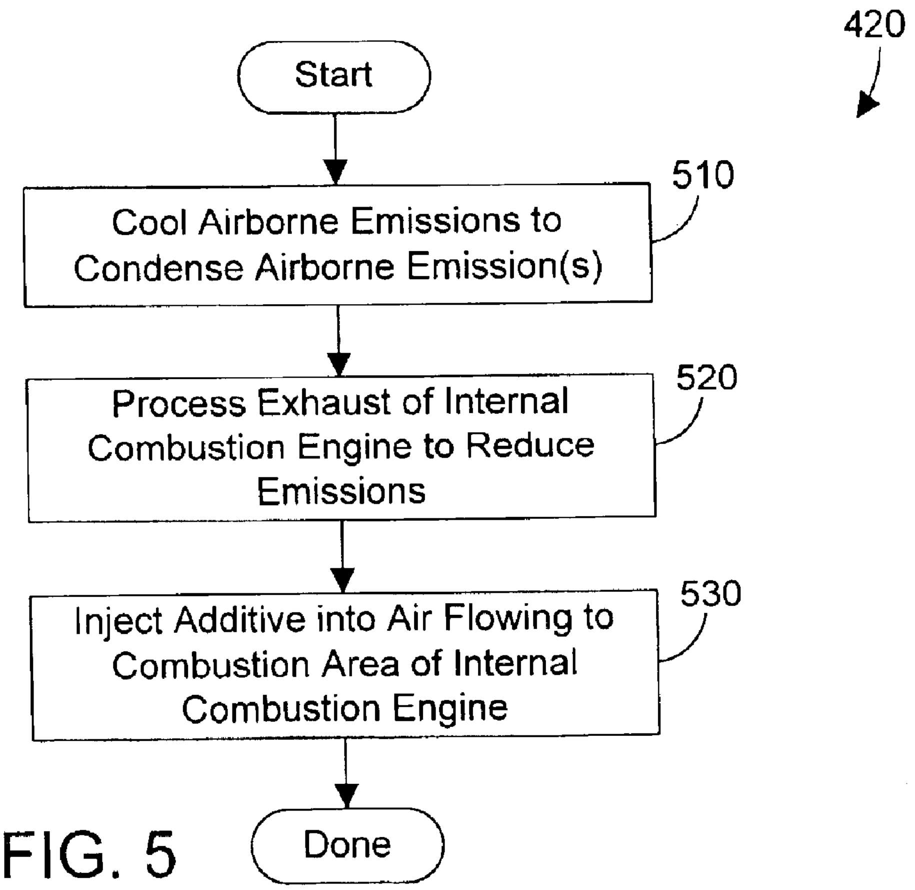
FIG. 5 is a diagram showing steps that may be optionally performed during step 420 of FIG. 4 in accordance with the preferred embodiments.

FIG. 5 shows steps that may be optionally performed during step 420 of FIG. 4. The airborne emissions may be cooled to condense one or more of the airborne emissions out of the airflow (step 510). Condenser 310 in FIG. 3 could perform this function. The exhaust of the internal combustion engine could be processed to reduce emissions (step 520). The emission reduction mechanism 360 in FIG. 3 could perform this function. An additive could be injected into the air flowing to the combustion area of the internal combustion engine (step 530). Injection mechanism 320 of FIG. 3 could perform this function. Note that steps 510, 520 and 530 are each steps that may be optionally performed independently of each other.

Figure 6:
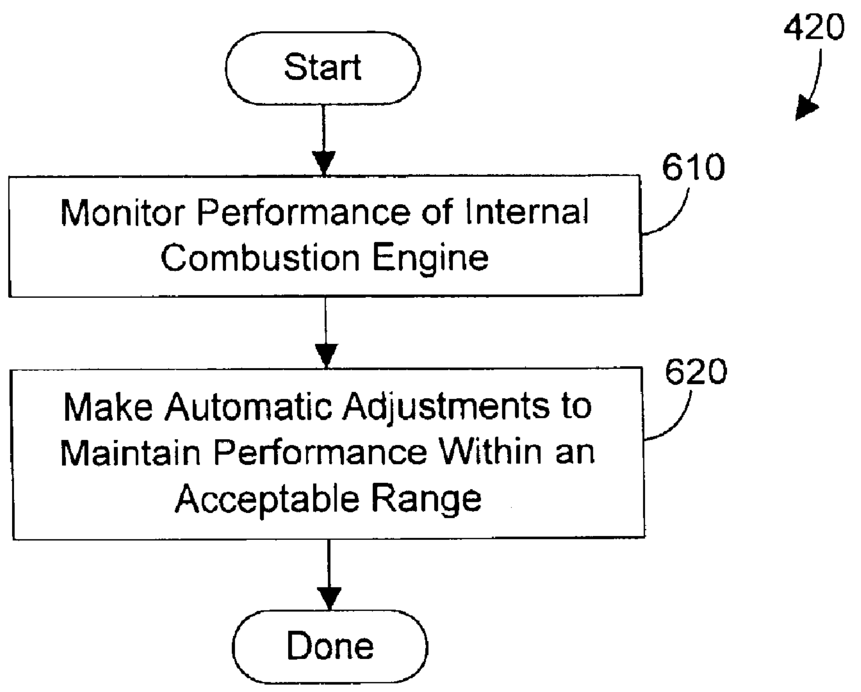
FIG. 6 is a flow diagram showing steps that may be optionally performed during step 420 of FIG. 4 in accordance with the preferred embodiments.

FIG. 6 shows other steps that may be optionally performed during step 420 of FIG. 4. The performance of the internal combustion engine may be monitored (step 610). Engine monitor 330 of FIG. 3 could perform this function. Automatic adjustments may then be made to maintain the performance of the internal combustion engine within an acceptable range (step 620). Automatic control mechanism 340 of FIG. 3 could perform this function.

Figure 7:
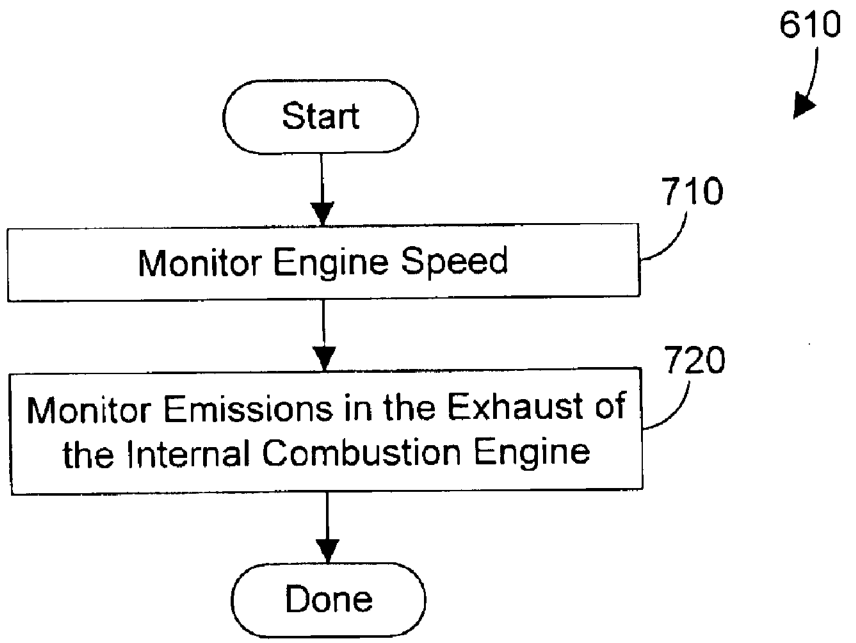
FIG. 7 is a flow diagram showing steps that may be optionally performed during step 610 of FIG. 6 in accordance with the preferred embodiments.

FIG. 7 shows steps that may be optionally performed during step 610 of FIG. 6. The engine speed may be monitored (step 710). This may be performed by engine monitor 330 in FIG. 3. The emissions in the exhaust of the internal combustion engine can also be monitored (step 720). This may be performed by exhaust monitor 350 in FIG. 3. Note that steps 710 and 720 are each steps that may be optionally performed independently of each other.

Figure 8:
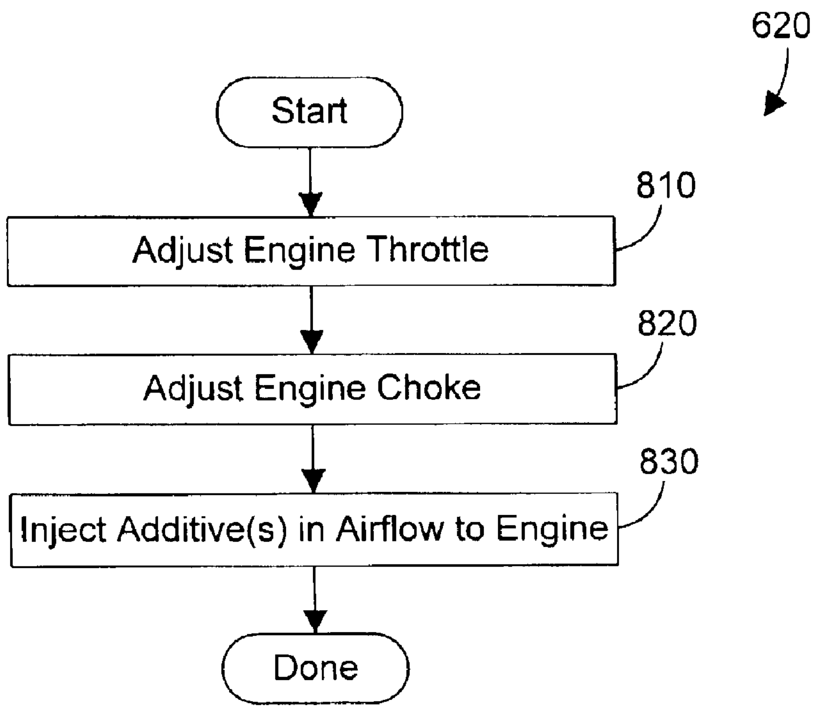
FIG. 8 is a flow diagram showing steps that may be optionally performed during step 620 of FIG. 6 in accordance with the preferred embodiments.

FIG. 8 shows steps that may be optionally performed during step 620 of FIG. 6. The engine throttle may be adjusted (step 810). The engine choke may be adjusted (step 820). One or more additives may be injected into the airflow to the engine (step 830). All of steps 810, 820 and 830 may be performed under control of the automatic control mechanism 340 in FIG. 3, and each of these steps may be performed independently of the other steps.

The apparatus and method of the preferred embodiments provides a two-fold advantage over the prior art. First, the level of airborne emissions is reduced by combusting those emissions in the internal combustion engine that powers the apparatus. Second, the airborne emissions may actually enhance the fuel efficiency of the engine by providing fuel in the airborne emissions. For example, in processing soybeans, oil droplets may become airborne. If the internal combustion engine were a diesel engine, the amount of diesel fuel consumed may be significantly reduced due to the airborne oil droplets that are fed into the air intake of the engine. In another example, in processing soiled poultry litter as disclosed in the related copending application, one of the airborne emissions could be methane gas. Providing methane gas in the airflow that goes into the air intake of the engine could result in significant fuel savings as well.

Future research will help determine how to best optimize the apparatus and methods disclosed herein. For example, detailed laboratory analysis of the airborne emissions that result from processing a particular material will likely lead to specific design modifications and/or enhancements that result in enhanced system performance for processing that particular type of material. The preferred embodiments expressly include any future optimizations that are based on the features disclosed herein.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:

an internal combustion engine that includes at least one combustion area;

a processing mechanism powered by the internal combustion engine, wherein the processing mechanism processes a material, wherein during the processing of the material at least one airborne emission is generated that is separate from exhaust generated by the internal combustion engine; and an air feedback mechanism that directs the at least one airborne emission to the at least one combustion area in the internal combustion engine.

2. The apparatus of claim 1 further comprising a condenser in the air feedback mechanism.

3. The apparatus of claim 1 further comprising an emission reduction mechanism coupled to the exhaust of the internal combustion engine.

4. The apparatus of claim 1 further comprising an injection mechanism coupled to the air feedback mechanism that injects at least one additive into air flowing through the air feedback mechanism.

5. The apparatus of claim 1 further comprising:

an engine monitor that monitors the performance of the internal combustion engine; and an automatic control mechanism that automatically adjusts the internal combustion engine to maintain performance of the internal combustion engine within an acceptable range.

6. The apparatus of claim 1 further comprising:

an exhaust monitor that monitors emissions in the exhaust of the internal combustion engine; and an automatic control mechanism that automatically adjusts the internal combustion engine to minimize the emissions in the exhaust.

7. The apparatus of claim 6 wherein the automatic control mechanism automatically adjusts the internal combustion engine by injecting at least one additive into air flowing through the air feedback mechanism.

8. The apparatus of claim 1 wherein the air feedback mechanism comprises a collection mechanism coupled to a conduit, wherein the collection mechanism collects the at least one airborne emission and wherein the conduit delivers air from the collection mechanism to the at least one combustion area in the internal combustion engine.

9. An apparatus comprising:

a screw-type extruder that processes an agricultural material, the extruder being powered by an internal combustion engine that includes at least one combustion area, the extruder comprising at least one auger that compresses the agricultural material, wherein the compression of the agricultural material generates at least one airborne pollutant that is separate from exhaust generated by the internal combustion engine; and an air feedback mechanism that directs the at least one airborne pollutant to the at least one combustion area in the internal combustion engine.

10. The apparatus of claim 9 further comprising a condenser in the air feedback mechanism.

11. The apparatus of claim 9 further comprising an emission reduction mechanism coupled to the exhaust of the internal combustion engine.

12. The apparatus of claim 9 further comprising an injection mechanism coupled to the air feedback mechanism that injects at least one additive into air flowing through the air feedback mechanism.

13. The apparatus of claim 9 further comprising:

an engine monitor that monitors the performance of the internal combustion engine; and an automatic control mechanism that automatically adjusts the internal combustion engine to maintain performance of the internal combustion engine within an acceptable range.

14. The apparatus of claim 9 further comprising:

an exhaust monitor that monitors emissions in the exhaust of the internal combustion engine; and an automatic control mechanism that automatically adjusts the internal combustion engine to minimize the emissions in the exhaust.

15. The apparatus of claim 14 wherein the automatic control mechanism automatically adjusts the internal combustion engine by injecting at least one additive into air flowing through the air feedback mechanism.

16. The apparatus of claim 9 wherein the air feedback mechanism comprises a collection mechanism coupled to a conduit, wherein the collection mechanism collects the at least one airborne emission and wherein the conduit delivers air from the collection mechanism to the at least one combustion area in the internal combustion engine.

17. An apparatus comprising:

a screw-type extruder that processes an agricultural material, the extruder being powered by an internal combustion engine that includes at least one combustion area, the extruder comprising at least one auger that compresses the agricultural material, wherein the compression of the agricultural material generates at least one airborne pollutant that is separate from exhaust generated by the internal combustion engine;

an air feedback mechanism that directs the at least one airborne pollutant to the at least one combustion area in the internal combustion engine, wherein the air feedback mechanism comprises a collection mechanism coupled to a conduit, wherein the collection mechanism collects the at least one airborne emission and wherein the conduit delivers air from the collection mechanism to the at least one combustion area in the internal combustion engine;

an injection mechanism coupled to the air feedback mechanism that injects at least one additive into air flowing through the air feedback mechanism;

a monitor that monitors emissions in the exhaust of the internal combustion engine; and an automatic control mechanism coupled to the injection mechanism and to the monitor, the automatic control mechanism determining from the monitor a level of emissions in the exhaust and activating the injection mechanism to inject at least one additive into air flowing through the air feedback mechanism to minimize the emissions in the exhaust.

18. The apparatus of claim 17 further comprising a condenser in the air feedback mechanism.

19. The apparatus of claim 17 further comprising an emission reduction mechanism coupled to the exhaust of the internal combustion engine.

20. A method for processing a material comprising the steps of:

processing the material using an apparatus that is powered by an internal combustion engine having at least one combustion area, wherein the processing of the material generates at least one airborne emission that is separate from exhaust generated by the internal combustion engine; and directing the at least one airborne emission to the at least one combustion area of the internal combustion engine.

21. The method of claim 20 further comprising the step of cooling the at least one airborne emission to condense at least one of the airborne emissions.

22. The method of claim 20 further comprising the step of processing the exhaust of the internal combustion engine to reduce emissions.

23. The method of claim 20 further comprising the step of injecting at least one additive into air flowing through the air feedback mechanism.

24. The method of claim 20 further comprising the steps of:

monitoring the performance of the internal combustion engine; and automatically adjusting the internal combustion engine to maintain performance of the internal combustion engine within an acceptable range.

25. The method of claim 20 further comprising the steps of:

monitoring emissions in the exhaust of the internal combustion engine; and automatically adjusting the internal combustion engine to minimize the emissions in the exhaust.

26. The method of claim 25 wherein the step of automatically adjusting the internal combustion engine comprises the step of injecting at least one additive into air flowing through the air feedback mechanism.

27. A method for processing a material comprising the steps of:

processing the material using an apparatus that is powered by an internal combustion engine having at least one combustion area, wherein the processing of the material generates at least one airborne emission that is separate from exhaust generated by the internal combustion engine;

directing the at least one airborne emission to the at least one combustion area of the internal combustion engine;

monitoring emissions in the exhaust of the internal combustion engine; and automatically injecting at least one additive into air flowing through the air feedback mechanism to minimize the emissions in the exhaust.

* * * * *